United States Patent [19]

Braccio et al.

[11] Patent Number: 4,905,938

[45] Date of Patent: Mar. 6, 1990

[54] SPECIAL PURPOSE ROBOTIC END EFFECTOR

[75] Inventors: Matthew Braccio; David W. Gross; John J. Zimmer, all of Cherry Hill Township, Camden County; Jack R. Badura, Lawrence Township, Mercer County, all of N.J.

[73] Assignee: General Electric Company, East Windsor, N.J.

[21] Appl. No.: 214,251

[22] Filed: Jul. 1, 1988

[51] Int. Cl.⁴ ............................................. B64G 1/64
[52] U.S. Cl. .............................. 244/161; 244/135 A; 285/24; 285/26; 285/29; 403/338; 439/374; 439/680; 901/41; 901/28; 901/29
[58] Field of Search .............. 901/41, 28, 29; 285/24, 285/26, 28, 29, 80; 403/338; 439/374, 680; 244/135 A, 161

[56] References Cited

U.S. PATENT DOCUMENTS

| | | | |
|---|---|---|---|
| 455,021 | 6/1891 | Krehbiel | 285/29 |
| 881,968 | 3/1908 | Smith . | |
| 2,634,926 | 4/1953 | Worlidge | 244/135 |
| 2,634,927 | 4/1953 | Smith et al. | 244/135 |
| 3,054,080 | 9/1962 | Jepson | 339/66 |
| 3,629,791 | 12/1971 | Normann | 339/45 M |
| 3,701,549 | 10/1972 | Koomeg | 285/24 |
| 4,076,361 | 2/1978 | Campbell | 439/374 |
| 4,177,964 | 12/1979 | Hujsak et al. | 244/161 |
| 4,214,728 | 7/1980 | Fleischer | 251/149.2 |
| 4,370,091 | 1/1983 | Gagliardi | 901/29 |
| 4,421,371 | 12/1983 | Clark et al. | 339/64 M |
| 4,431,333 | 2/1984 | Chandler | 403/322 |
| 4,474,418 | 10/1984 | Yamada | 339/65 |
| 4,607,815 | 8/1986 | Turci et al. | 244/161 |
| 4,632,492 | 10/1986 | Yamada | 339/176 M |
| 4,640,572 | 2/1987 | Conlon | 339/252 P |
| 4,648,629 | 3/1989 | Baugh | 403/338 |
| 4,766,775 | 8/1988 | Hedge | 403/338 |
| 4,778,400 | 10/1988 | Jacobs | 439/374 |

*Primary Examiner*—Galen Barefoot
*Attorney, Agent, or Firm*—William H. Meise

[57] ABSTRACT

A robotic connector or interface includes a roughly conical male member in which the conical side may be concave. The male member includes a radial indexing pin, and a central bore in which polarized electrical connectors are located. A mating female member includes a cavity with a fundus and movable peripheral lips adapted for grasping the base of the male member when engaged for drawing the male member into full mating relation with the cavity. A tapered slot in the side of the female member guides the index pin to impart rotational forces so that mating can take place even if the approach is skewed. The electrical connectors are mounted on a separately indexed, spring loaded connector plate at the fundus of the cavity. A motor-driven linkage operates the peripheral lip members.

9 Claims, 12 Drawing Sheets

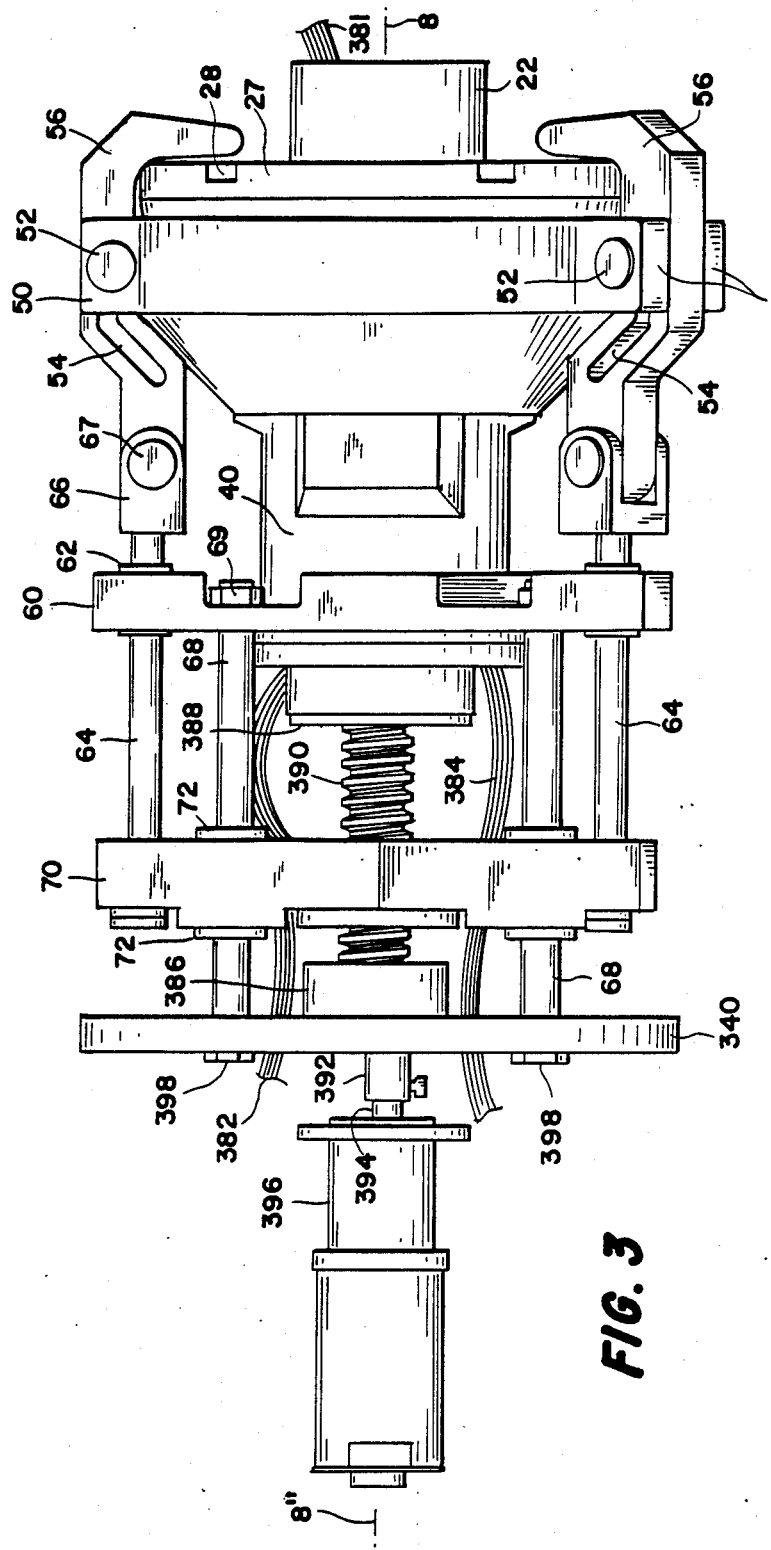

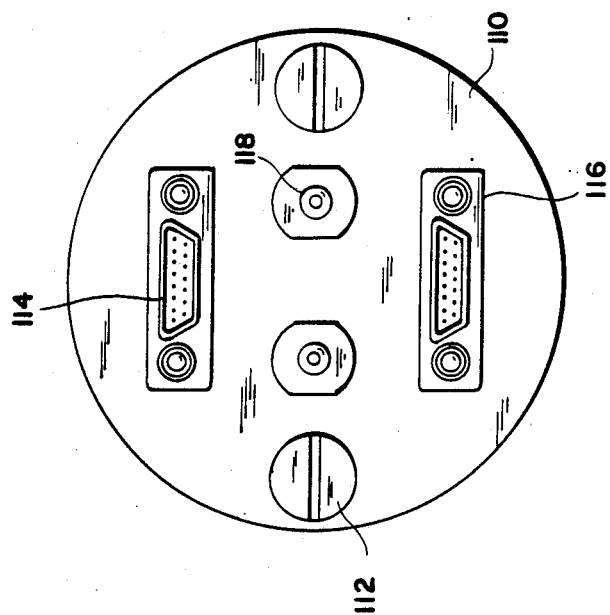
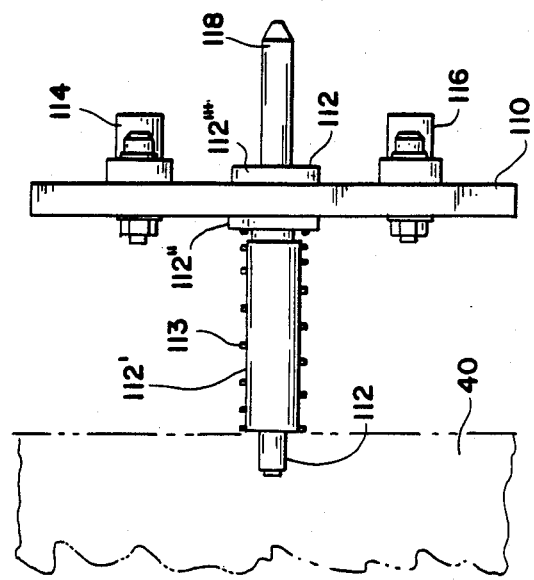

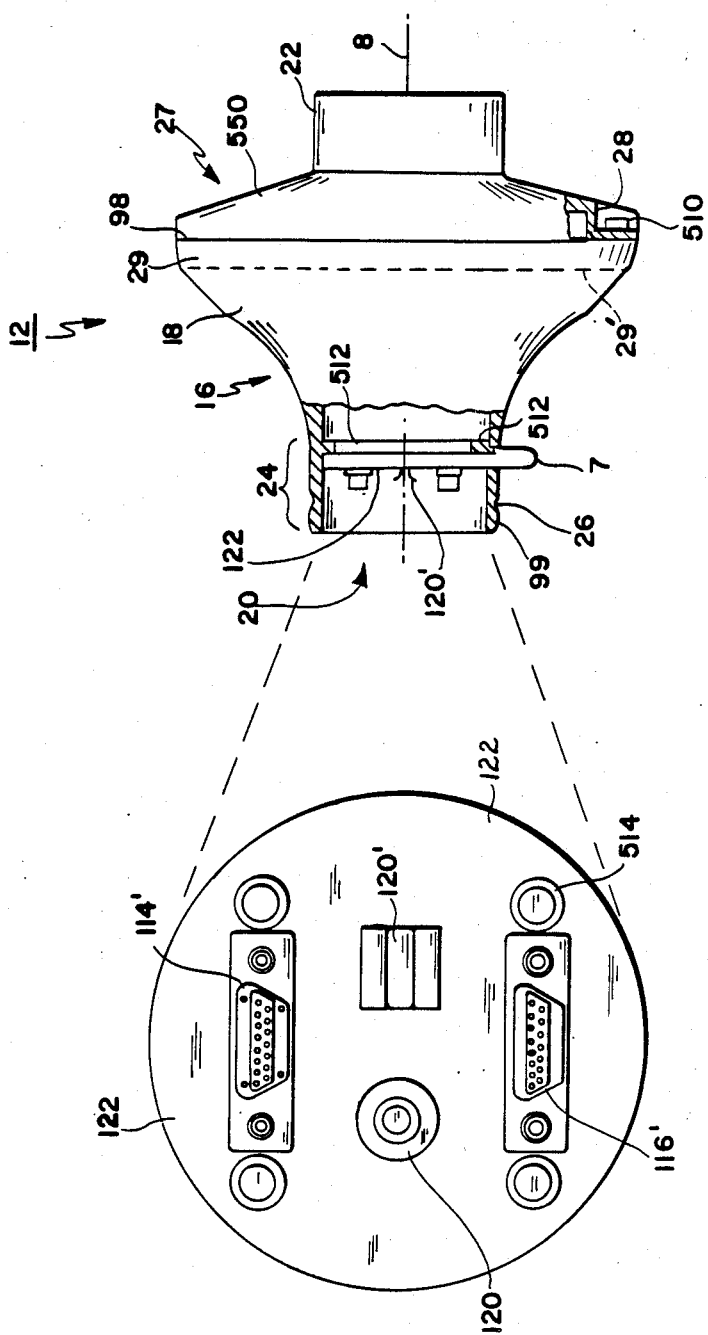

SPECIAL PURPOSE ROBOTIC END EFFECTOR

BACKGROUND OF THE INVENTION

This invention relates to connector arrangements which may be engaged at skewed angles, and which after engagement are rotated and tilted while progressing to a fully mated condition.

There are innumerable situations in which two structures may advantageously be coupled together in a releasable manner. For example, U.S. Pat. No. 4,214,728 issued Jul. 29, 1980 to Fleischer describes a releasable coupling arrangement for coupling together two fluid channels. In the Fleischer arrangement, the coupling is achieved by a conical head coaxial with a portion of the fluid channel, which mates with a correspondingly shaped cavity, also including a coaxial fluid channel. U.S. Pat. Nos. 2,634,926 and 2,634,927 issued to Worlidge and Smith et al., respectively, on Apr. 14, 1953, describe fluid connectors for transferring fuel between aircraft in flight. These connectors include axial fluid channels as does the Fleischer patent, but are arranged with a roughly conical head with convex outer surfaces for effectively mating with a corresponding cavity when engagement occurs at (or from) a skew angle other than precisely on-axis. Such connectors are arranged to disconnect or decouple if a load is imposed thereupon.

When electrical connections are to be made, at least two electrical conductors are required. A common type of electrical connector is the ordinary type N or type BNC coaxial connector, adapted for use with coaxial transmission lines. In such connectors, one of the electrical contacts is made by a conductor which is coaxially centered, and the other electrical contact is made by an annular conductor concentric with and insulated from the central conductor. When three connections are to be made, a triaxial connector may be used. For numbers of conductors exceeding three, the coaxial arrangement is unwieldy.

An alternative to the coaxial arrangement is the polarized connector, such as, for example, an ordinary two-wire wall plug and receptacle. The ordinary two-wire wall plug and socket is not polarized, since it is irrelevant which side of the plug contacts a particular side of the power source. If it is important that a particular conductor plug-receptacle pair be mated, it may be desirable to use polarized or keyed connectors, such as are described in U.S. Pat. No. 3,054,080 issued Sept. 11, 1962 to Jepson, and in U.S. Pat. No. 3,629,791 issued Dec. 21, 1971 to Normann. Such connectors ordinarily may be mated only after alignment of the mating keys. Achieving the proper keyway alignment in some keyed connector arrangements is difficult.

Most present-day robots include a single manipulable articulated arm. When only a single arm is available, it is desirable in many cases to be able to interchange the manipulated object for another, as for example by substituting a wrench for a screwdriver already mounted on the end of the articulated arm. When the robot arm is located in an environment hostile to humans, as, for example, an environment near a furnace, it may not be convenient to have a human perform the exchange. Instead, it is desirable to have the ability to disengage the articulable arm from the object being manipulated and to re-engage the arm with a different object under the control of the robot arm itself.

In many cases, the object being manipulated may itself require electrical power, as in the case of a power screwdriver or power socket wrench, and may further include such items as sensors for viewing the area near the object being manipulated, control arrangements or the like. Such additional sensors or control arrangements also require power and, in addition, must be connected for coupling the sensor signals to the controller of the robot, and for coupling signals to the control unit associated with the object being manipulated. Thus, it may be desirable to have multiple electrical connectors associated with the interface between the articulated arm and the object being manipulated. It may be difficult to readily position the articulated arm in such a fashion as to simultaneously align the interface or connector and the keyways necessary to mate the multiconductor electrical connectors. It is to be expected that manipulation of the articulated arm will achieve only an approximate axial alignment and rotational positioning relative to the key.

An interface or connector arrangement is desired which is capable of mating keyed electrical connectors from skewed angles, and which, when mated, is capable of transferring substantial structural loads between the sides of the interface.

SUMMARY OF THE INVENTION

A coupling arrangement for aligning and mating connectors, and for transfer of structural loads includes a male member with a head having the approximate shape of a frustum of a cone, a base and a central bore. The cone, the base and the central bore are centered on a first axis lying in a plane. The base is affixed to the structure to which the loads are transferred. The head includes at least one index element of a pair of index elements. The index element lies in the plane and projects into or away from the side in a radial direction relative to the first axis. A polarized first connector portion of a mating connector pair is located in the bore and is oriented for axial engagement. The first connector portion has a predetermined orientation relative to the first plane. A female member defines a cavity with an outer periphery. The cavity is centered on a second axis and has walls somewhat matching those of the cone. The walls define a fundus remote from the opening. The female member further includes at least one mating index element of the pair of index elements. The mating index member is centered on the second plane. The index pair includes a slot and a projection, which may be a pin or a key. If the slot is in the female member, its width is substantially equal to the diameter of the pin or key at locations nearest the fundus. The width of the slot tapers to a width greater than the diameter of the index pin or width of the key at locations remote from the fundus. If the slot is in the male member, its width is greatest near the small end. After engagement, the mating of the male and female members draws the first axis and the first plane into congruence with the second axis and the second plane, respectively. A polarized second connection portion of the polarized connector pair is mounted at the fundus of the cavity and oriented for axial engagement. The second connector portion has the same orientation relative to the second plane as the first connector portion has relative to the first plane, so that when the first and second planes are congruent, the connectors are correctly poled for mating. A movable lip is mechanically coupled to the periphery of the cavity and is adapted for movement between an open position which exposes the cavity and a closed position. The movable lip is adapted for grasping the head of the male member during engagement, and for drawing the head into and thereafter holding the head in full mating relationship with the cavity. When fully mated, rotary forces are transferred between the male and female members by the slot and the mating index protrusion. Axial forces are transferred between the head and the cavity and associated lip.

DESCRIPTION OF THE DRAWING

FIG. 3 is a side view of mated male and female members of an interface according to the embodiment of FIGS. 1 and 2, illustrating details of the arrangement for operating the finger or lip elements;

FIG. 4c is an expanded view of a portion of FIG. 4b, and FIG. 4d illustrates an elevation view of a portion of the connector plate of the female member of the interface arrangement;

FIG. 5a is a side view, partially cut away, of a male member such as that of FIG. 1, and FIG. 5b is an end view along the axis of the arrangement of FIG. 5a;

DETAILED DESCRIPTION OF THE INVENTION

Figure 1:
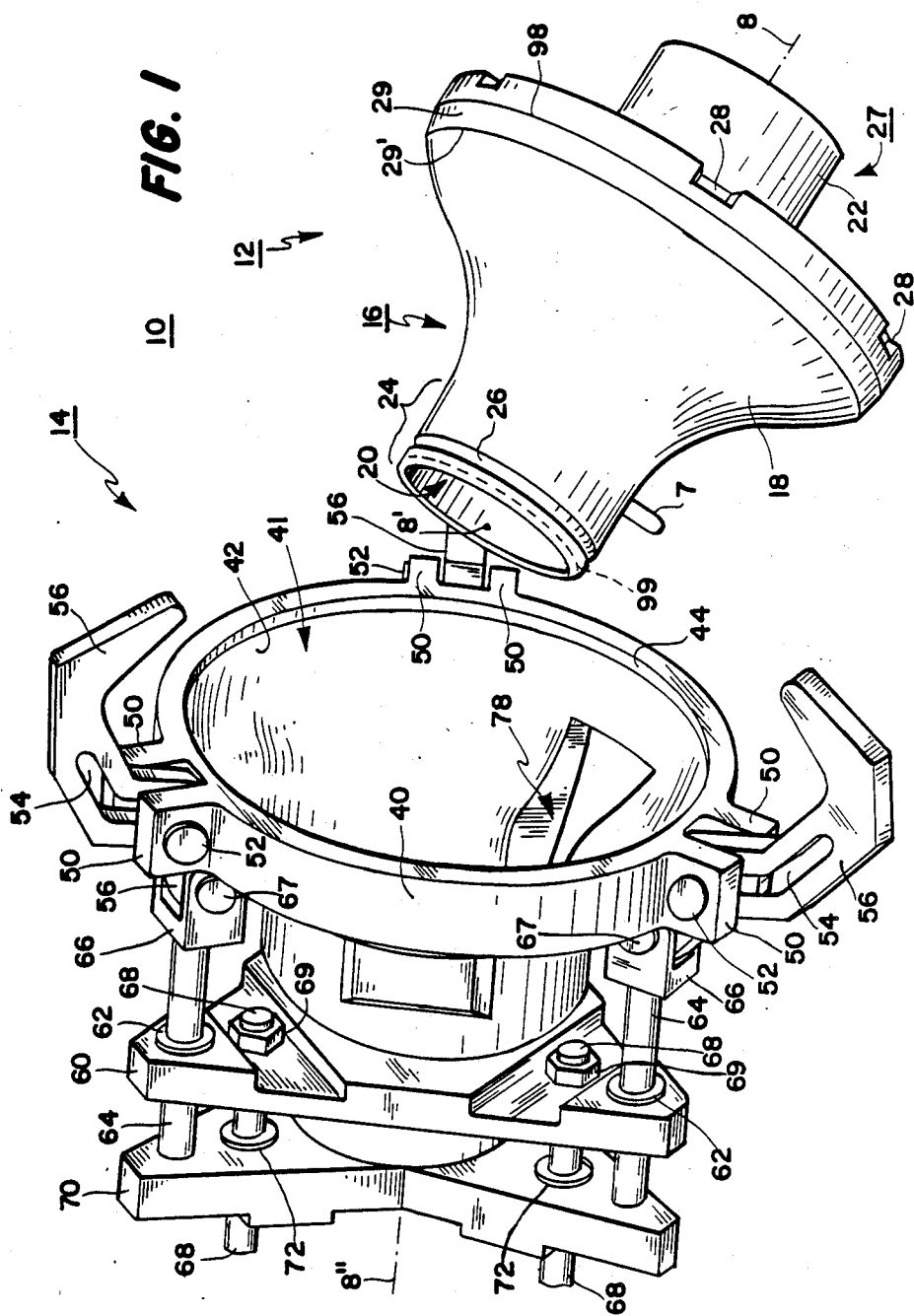
FIG. 1 is a perspective or isometric view of the male and female components, portions or members of an interface arrangement according to an embodiment of the invention, illustrating approach toward engagement at a skew angle.

In FIG. 1, a coupling or interface arrangement designated generally as 10 includes a male element or member 12 and a female element or member 14. Male member 12 includes a head designated generally as 16 in the general form of a cone having a side defined by a surface 18 which is rotationally symmetric about an axis 8. An axial bore 20 extends at least part-way through head 16. Male member 12 is made up of two major halves separated at a parting line 98. A first half of male member 12 includes a base portion 27, and the second half includes an approximately conical head 16. Cutouts 28 in base portion 27 allow screws (not visible in FIG. 1) to be countersunk. A shaft, part of which is illustrated as 22, is coupled to base 27 of male member 12. A portion of surface 18 in a region 24 near bore 20 has a shape similar to that of a circular cylinder relative to central axis 8, while the major portion of surface 18 is concave. An annular depression or groove illustrated as 26 within cylindrical region 24 is dimensioned so that the portion of surface 18 between groove 26 and the edge of bore 20 has a roughly spherical surface, centered on a point 8' lying on axis 8. An index pin 7 protrudes radially from surface 18. A surface region 29 of conical head 16 defined between a line 29' and parting line 98 has a slight taper such as 10°.

Female member or element 14 includes a housing 40 defining a cavity 41 with interior walls defining a surface 42 with the general shape of the interior of a bell centered on an axis 8". Surface 42 is dimensioned to slightly clear surface 18 except for a close fit in regions described below. Cavity 41 has a periphery 44 around the larger end of the cavity, and a fundus or closed portion 46 (not visible in FIG. 1) remote from outer periphery 44.

Inner surface 42 of female cavity 41 defines or contains a tapered slot 78, not all of which is visible in FIG. 1, which coacts with index pin 7 to provide mutual rotational adjustment of mating members 12 and 14 while they are brought into a mating condition after engagement.

The structure or housing 40 of female member 14 includes three similar pairs of spaced-apart lugs 50, the pairs being equally spaced by a 120° about axis 8". Each set of lugs 50 is penetrated by a shaft or screw 52 which passes through and rides above a curved, elongated slot or track 54 of a finger or lip member 56. The remaining portions of female element 14 which are illustrated in FIG. 1 are portions associated with the mechanism for opening and closing of fingers 56.

Housing 40 of female element 14 includes a triangular base plate 60. Base plate 60 supports three linear bearings 62, only two which are visible in FIG. 1. A shaft 64 extends through each linear bearing 62, and is arranged for axial motion. Each shaft 64 ends in a forked yoke 66, which encloses the end of a finger or lip member 56. A pin 67 extending through the furcations of each yoke 66 extends through an aperture (not illustrated in FIG. 1) in an end of each finger 56, whereby axial motion of a shaft 64 through its associated linear bearing 62 moves the end of the associated finger 56 which is pinned to the yoke 66, thereby causing the finger 56 to move between open positions (the position illustrated in FIG. 1) and closed positions (illustrated in FIGS. 3 and 4).

Referring to FIG. 1, three shafts 68 extend through base plate 60 and are affixed thereto by nuts 69. A triangular actuating plate 70 supports three linear bearings 72, through which shafts 68 extend. Thus, actuating plate 70 may move axially along shafts 68 toward and away from base plate 60. The ends of shafts 64 are affixed to actuating plate 70 by a system of nuts and Belleville washers (better illustrated in FIG. 3) thereby creating a rigid attachment with a slight springiness. Axial movement or translation of actuating plate 70 along shafts 68 toward and away from base plate 60 causes simultaneous actuation of fingers 56 to the open and closed conditions, respectively.

Figure 2:
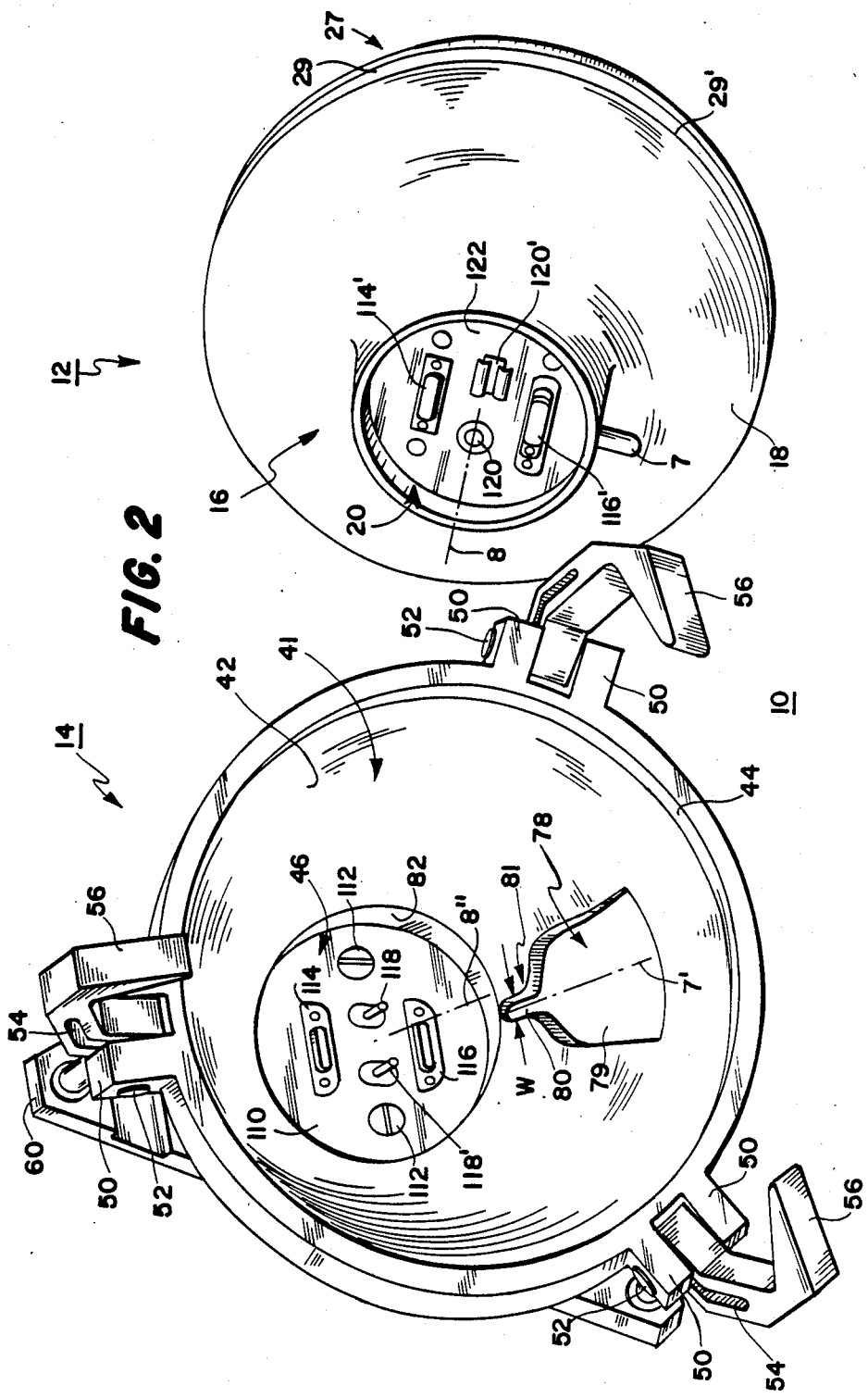
FIG. 2 illustrates perspective or isometric end views of the male and female members of the interface of FIG. 1.

FIG. 2 illustrates the mating ends of male element 12 and female element 14 in perspective or isometric view. Elements of FIG. 2 corresponding to those of FIG. 1 are designated by the same reference numerals. The shape of tapered slot 78 within cavity 41 is more easily seen in FIG. 2. As illustrated therein, tapered slot 78 includes a broad shallow portion 79 nearer the periphery of the opening of cavity 41, and a neck portion 80 with a width W which is substantially equal to the diameter of index pin 7 of male member 12. As illustrated, tapered slot 78 is centered on a plane defined by axis 8″ and a dashed line 7′.

In the region of fundus 46 of cavity 41, the bell-shaped inner surface 42 makes a transition into a region including cylindrical walls 82. As described in more detail below, a connector plate 110 nominally orthogonal to axis 8″ is spring-mounted for slight axial movement, and is retained by screws 112. Connector plate 110 bears a pair of multiconductor electrical connector halves 114, 116, which are polarized or keyed for mating in only one manner. Connector halves 114, 116 are centered on the plane defined by axis 8′ and line 7′. Connector plate 110 also bears a pair of alignment pins 118, 118′, which have fixed positions relative to electrical connectors 114 and 116, for providing lateral indexing and guidance during mating.

Bore 20 in male member 12 extends to a surface 122 which is visible in FIG. 2. A circular aperture 120 and an elongated aperture 120′ are defined in surface 122 for mating with index pins 118 and 118′, respectively. The elongation of aperture 120′ prevents mismating, non-mating or jamming attributable to expansion or contraction due to temperature differences. Polarized connector half elements 114′, 116′ adapted to mate with connector halves 114, 116 respectively, are supported by surface 122. Apertures 120 and 120′, and the mounting of connector halves 114′, 116′ are symmetrically disposed relative to a plane defined by axis 8 and the centerline of index pin 7.

During initial mating, fingers or lip members 56 are in the positions illustrated in FIGS. 1 and 2, providing free access to cavity 41. After partial engagement has been effected, fingers 56 are actuated to begin to close, thereby causing fingers or lips 56 to press against the back of base 27 to draw male member 12 into cavity 41. Male member 12 may engage female member 14 at an angle in which axes 8 and 8′ are skewed approximately as much as is illustrated in FIG. 1, which will result in forces tending to result in axial alignment. A rotational mismatch is also tolerated by the width of tapered slot 78, which provides rotational restoring forces tending to force mutual rotation of the male and female members, until index pin 7 reaches the entrance 81 of neck 80 of slot 78. At such a position, index pins 118, 118′ mounted on connector plate 110 are just beginning to engage apertures 120, 120′ of the male member. Thus, the shape of slot 78 tends to correct rotational misalignment sufficiently for index pins 118 to move connector plate 110 to provide a final alignment which allows connectors 114, 116 to mate. As engagement toward full mating proceeds, index pin 27 proceeds toward fundus 46 within neck 80 of slot 78, whereupon index pins 118 provide a final two-axis alignment of movable connector plate 110 relative to bottom surface 122 of bore 20 of male member 12. As fingers 56 close fully to fully mate male member 12 in female member 14, connector halves 114, 114′ and 116, 116′ become fully mated.

It is advantageous to have contact at defined areas for ease of calculation and repeatability. Contact is provided between male and female members along two coaxial annular regions. A first contact is along a dashed line 99 (FIG. 1) lying on the spherical surface defined by groove 26 of male member 12 and a corresponding portion of cylindrical portion 82 of female member 14.

A second contact area occurs along region or surface 98′ on conical head 16 of male member 12 and a corresponding region near the periphery 44 of female member 14.

FIG. 3 illustrates mated male and female members, with further details of the supporting structure for female member 14 and the drive arrangement for fingers 56. Elements of FIG. 3 corresponding to those of FIGS. 1 and 2 are designated by the same reference numbers. In FIG. 3, a support plate 340 is connected by nuts 398 to the ends of shafts 68 remote from bottom plate 60 of housing 40. A controllable bidirectional motor 396 has its body attached by means (not illustrated in FIG. 3) to support plate 340, and has a shaft 394 coupled by means of a collar and screw, designated together as 392, to a threaded shaft 390 which is supported for rotation on bearings (not visible in FIG. 3) located in bearing housings 386 and 388. Shaft 390 has Acme threads, and is threaded through a correspondingly threaded collar (420, visible in FIG. 4a) centered in and fastened to actuating plate 70.

A bundle of wires 384 enters the bottom of housing 40 adjacent thrust bearing housing 388, and passes through apertures (not illustrated) in acutating plate 70 and support plate 340. A similar bundle of wires 382 follows a corresponding path in a location above a bundle of wires 384. Wires of bundles 382 and 384 make connection with multiconductor connector portions 114, 116 illustrated in FIG. 2. A wire bundle 381 extends through shaft 22 of male member 12 to connect to the connector halves therein, thereby providing continuous electrical connection in the mated condition, as required for control, sensing and powering.

Figure 4A:
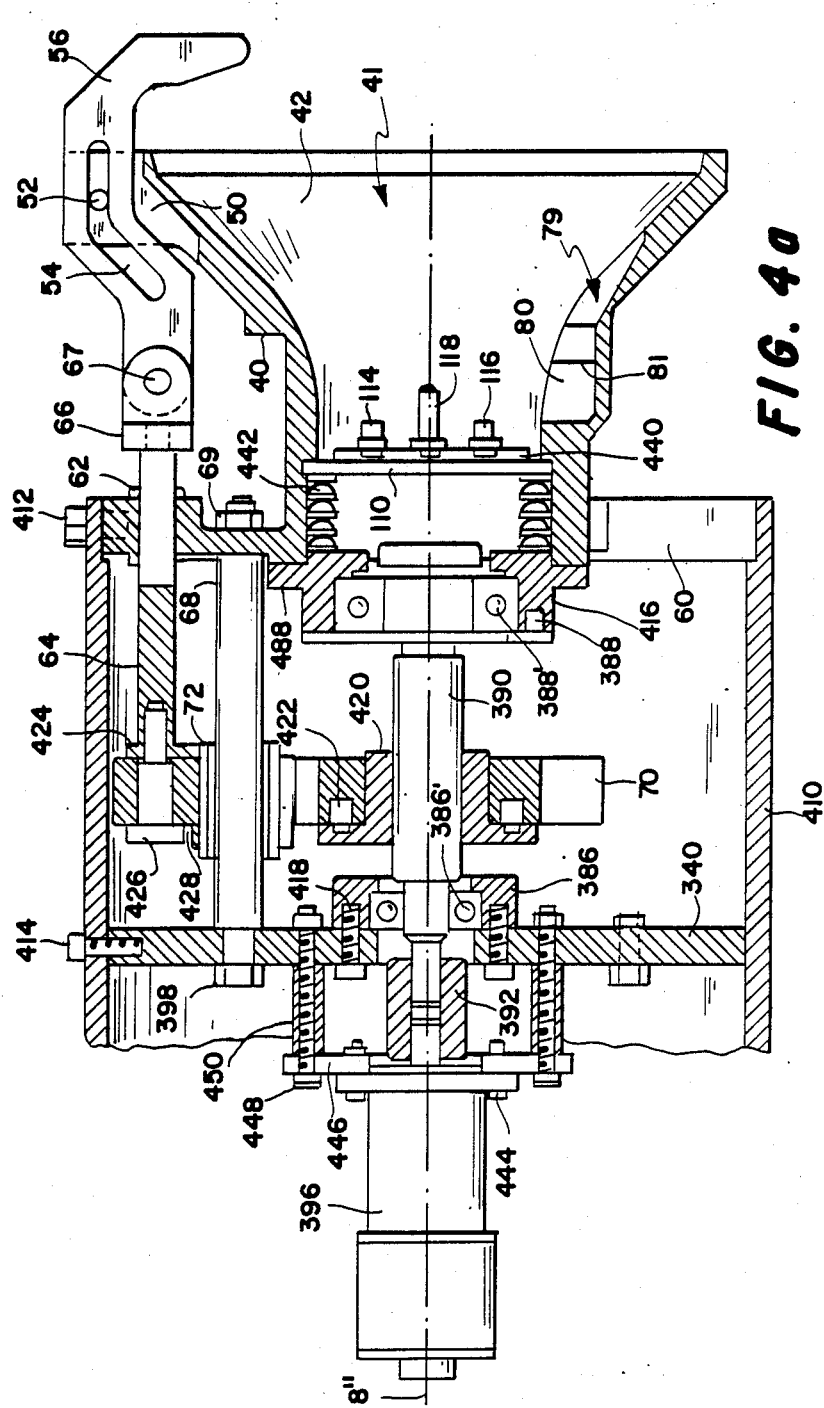
FIG. 4a is a cross-section of the female member of the structure illustrated in FIG. 3 through an axis, illustrating the finger or lip elements in their closed position.

FIG. 4a is a cross-section of the structure illustrated in FIGS. 1, 2 and 3, with finger or lip members 56 in their closed position, further illustrating a cover for the finger or lip actuating mechanism, and illustrating further details of the support for motor 396. Elements of FIG. 4a corresponding to those of FIGS. 1, 2 and 3 are designated by the same reference numerals. In FIG. 4a, a cylindrical metal cover 410 is affixed to base plate 60 and support plate 340 by screws such as 412, 414, respectively. A thrust bearing 388′ within housing 388 supports threaded shaft 390. Housing 388 includes flange 488 held by screws 416 to housing 40. Similarly, a radial bearing 386′ is located within bearing housing 386. Bearing housing 386 is held to support plate 340 by screws 418. Threaded, flanged insert 420 is held to actuating plate 70 by means of screws 422.

Connector plate 110 is pressed against a lip 440 in housing 40 by a stack of wavy washers illustrated as 442. Motor 396 is mounted by screws 444 onto a plate 446 which is mounted to support plate 340 by a set of screws 448 and spacers 450 to provide for a preset height of motor 396 above plate 340, thereby permitting motor coupler 392 to be engaged. As mentioned, each finger actuating shaft 64 is held to actuating plate 70 in a manner providing for slight motion. As illustrated in FIG. 4a, shaft 64 is held in place by a C clip 424 and by a screw 426 threaded into shaft 64 together with a Belleville washer 428.

Figure 4B:
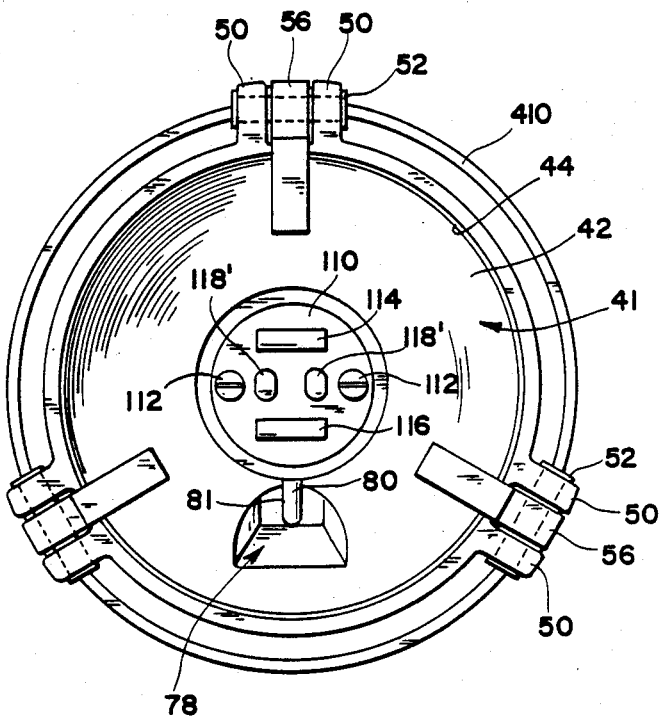
FIG. 4b is an end view of the female member of the interface arrangement with the finger or lip elements in their closed positions.

FIG. 4b is an end view of female member 14 with fingers 56 in their closed positions, and FIG. 4c is an expanded view of connector plate 110. Elements of FIGS. 4b and 4c corresponding to those of FIGS. 1–3 are designated by the same reference numerals.

FIG. 4d is a cross section illustrating the support of connector plate 110. In FIG. 4d, connector plate 110 bearing pins 118 and connectors 114 and 116 is spaced from the supporting portion of housing 40. Connector plate 110 is restrained from motion to the right in FIG. 4d by the head 112''' of a screw 112 threaded into housing 40. A sleeve 112' and a washer 112'' surround the shaft of screw 112. Washer 112'' bears against connector plate 110. A coil spring 113 surrounds sleeve 112 and provides force tending to push connector plate 110 against the head 112''' of screw 112. The dimensions are selected so that connector plate 110 can move toward housing 40 by a small amount before washer 112'' bears against sleeve 112' to prevent further motion.

FIG. 5a is a cross section, partially cut away, of male member 12. In FIG. 5a, the halves of member 12 are seen to be held together by screws such as 510, the heads of which lie below the surface in counterbored slots 28. Also visible in FIG. 5a is the taper of the rear surface 550 of base 27 of male member 12, which is believed to provide more consistent bearing surfaces for the action of fingers 56 by comparison with a flat surface, and which tends to direct forces toward axis 8 for centering. As illustrated in FIG. 5a, conical portion 16 includes an integral interior ring or lip 512. Ring 512 provides a surface for support of connector plate 122. FIG. 5b is an expanded end view of the surface of connector plate 122, apertures 120 and connector halves 114', 116'. As illustrated in FIG. 5b, connector plate 122 is held by four screws, one of which is designated 514. Screws 514 are threaded into holes (not illustrated) in ring 512.

Figure 6:
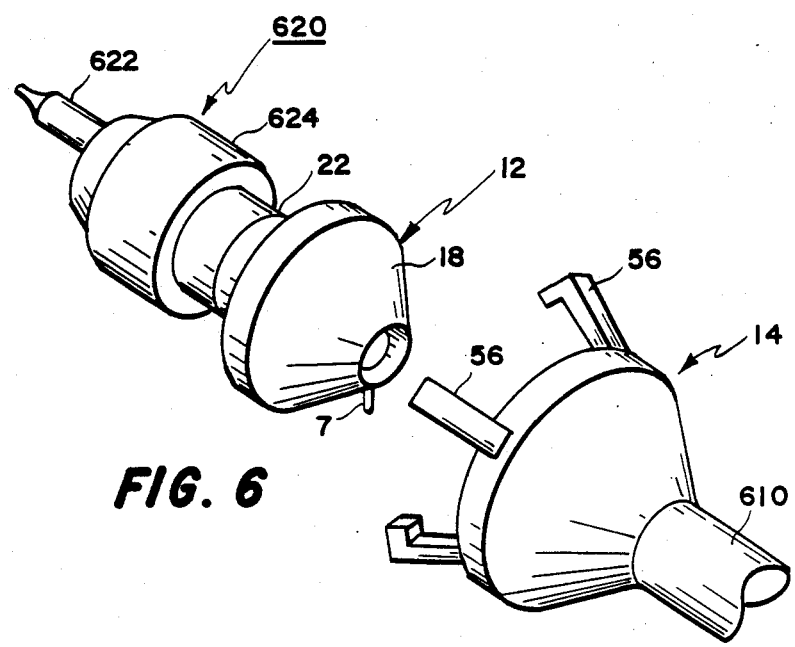
FIG. 6 illustrates the arrangement of FIGS. 1-5 arranged for coupling a tool to a robot arm.

FIG. 6 is a sketch representing a robot end effector including a female element 14 at the end of the articulated arm 610 of a robot, arranged for being mated with a male portion 12 which is coupled by its shaft 22 to a power screwdriver designated generally as 620 for operating on a screwdriver bit 622. Power screw driver 620 includes an electrically driven motor 624 which receives power and directional control signals by way of the connectors associated with male member 12 and female member 14, as described above.

Axial forces between robot arm 610 and support shaft 22 are transferred in one direction by the mating of surface 29 (FIG. 1) with portion 44 of interior surface 42 of female member 14, and in the other direction by the rear surface 550 (illustrated in FIG. 5a) of male member 12 acting against the contacting edges of fingers 56. Rotational forces are transferred by way of index pin 7 and associated slot 78. Moments are transferred by reacting as coupled loads acting at the interface of surfaces 29 and 44, and at the interface of line contact 99 of member 12 and line contact 82 of member 14.

Figure 7:
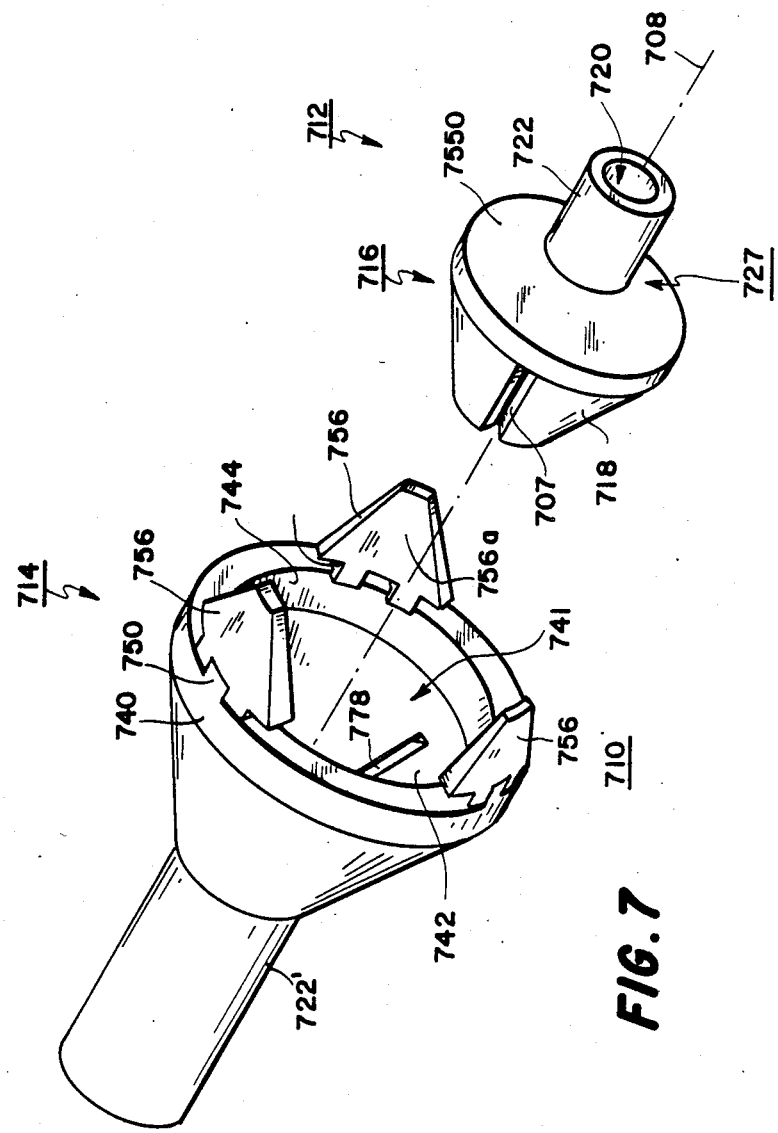
FIG. 7 illustrates in simplified perspective or isometric view male and female members of a second embodiment of the invention in which the indexing protrusion is in the cavity and the corresponding slot is on the male head.

In FIG. 7, a coupling or interface circuit designated generally as 710 includes a male member or element 712 and a female member 714. Male member 712 includes a head designated generally as 716 in the general form of a cone having a side defined by a surface 718 which is rotationally symmetric about an axis 708. An axial bore 720 extends through head 716. Male member 712 is made up of two major halves, as in the case of head 16 of FIG. 1. One half is conical portion 716, and the other includes base portion 727. A shaft, part of which is illustrated as 722, is coupled to base 727 for transferring loads therebetween. An elongated indexing slot 707 is formed in conical portion 718, centered on a plane (not illustrated) in which axis 708 lies.

Figure 10:
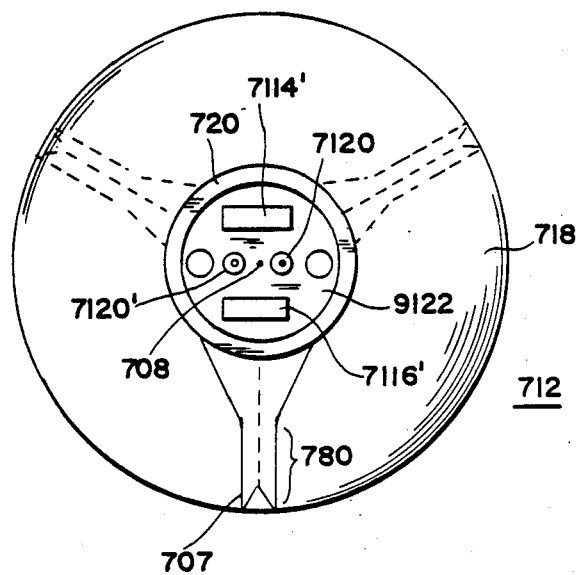
FIG. 10 is an end view of the mating position of the male element of the arrangement of FIG. 7.

FIG. 10 is an axial view of male member 712 looking from the mating side. As illustrated in FIG. 2, surface 718 of male member 712 includes at least one index slot 707. Two other identical slots angularly spaced by 120° around axis 708 are illustrated in phantom to indicate that they are optional. All index slots are identical, so only one is described in detail in relation to FIG. 10. As illustrated, slot 707 is roughly vee-shaped in cross-section, and includes a portion 780 nearest the base (nearest to the large-diameter portion of male member 712) which has a constant lateral width. At locations nearer the distal or small end of male member 712, the width of slot 707 increases. The depth below the surface 718, however, increases only slightly, so that the vee bottom becomes indistinguishable in the wide portion of the slot near the small end of the conical portion 716 of male member 712.

Female member or element 714 (FIG. 7) includes a housing 740 defining a cavity 741. Female member 714 is coupled to a support structure illustrated as a shaft 722'. Cavity 741 has interior walls defining a surface 742 with outer periphery 744, and with a conical shape centered on axis 708. An elongated index protrusion or key 778 protrudes above the inner surface 742 of cavity 741. The axis of elongation of key 778, and the direction of protrusion, lie in a plane (not illustrated) passing through axis 708. Surface 742 may be dimensioned to fit conical head 716, but preferably is dimensioned so that when mated, the principal portion of surface 718 of conical head 716 clears cavity surface 741. This is accomplished, as described below, by making index protrusion 778 bottom in the index slot 707, so that the male and female members make contact along one or more elongated lines defined by one or more mating protrusion-slot pairs.

Mating is initiated from a position similar to that illustrated in FIG. 7 by moving the male and female members relatively closer together, with at least some effort to obtain the necessary rotational positioning. When the wide end of elongated slot 707 of the male member 712 meets elongated protrusion 778 of female member 714, axial force tending to push the male and female members together tends to cause a moment or rotational force tending to rotate the male and female members toward correct alignment.

Female member 714 as illustrated in FIG. 7 includes three lip members or fingers 756 which are hinged by pins, one of which is designated 752, to lugs 750 integral with housing 740 near the outer periphery of cavity 741. Finger members 756 are actuable between a closed position and the open position illustrated in FIG. 7. The open position exposes the cavity for reception of male member 712. After mating is initiated, fingers 756 may be actuated from the open position toward a closed position, whereby the inner surfaces 756a of fingers 756 bear against rear surface 7550 of male member 712, thereby drawing male member 712 into full mating relationship with female member 714.

Figure 8:
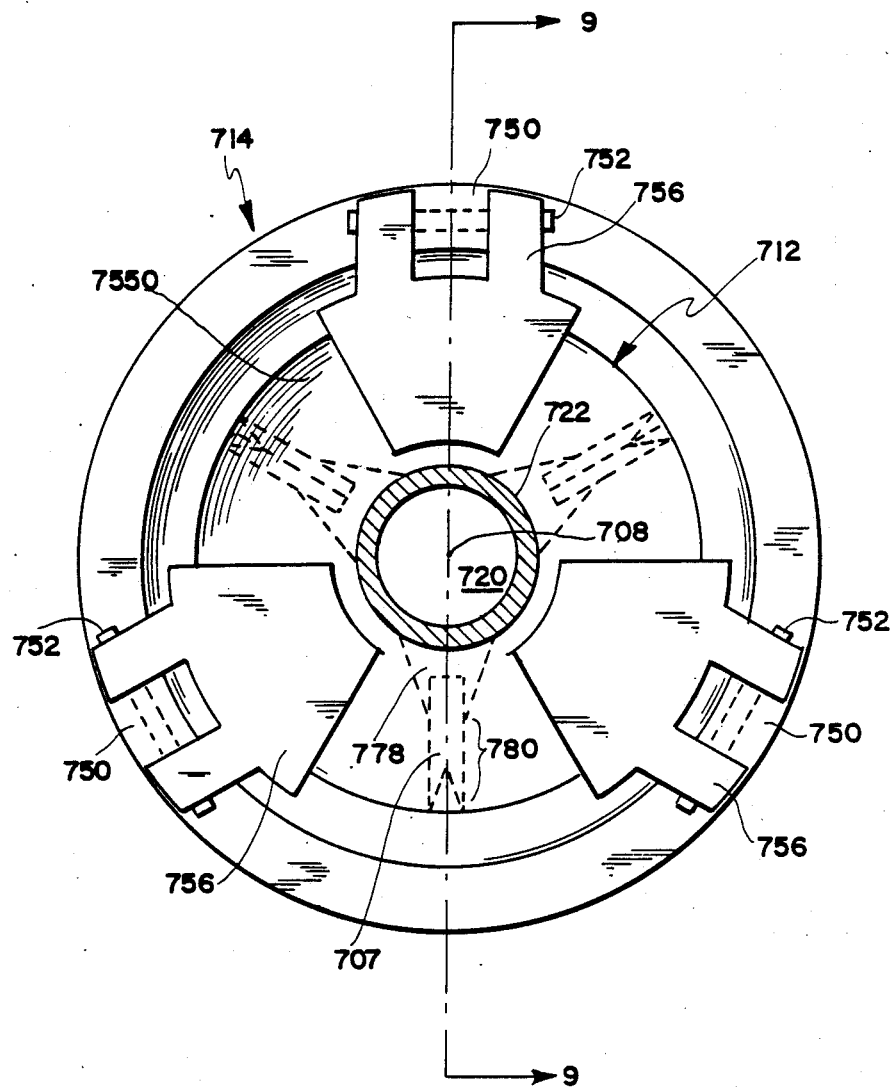
FIG. 8 is an end view of the arrangement of FIG. 7 with the elements mated.

FIG. 8 is an axial view of mated male and female members, looking from the male member side. As illustrated in FIG. 8, fingers 756 are in the closed position, with their inner surfaces (not visible in FIG. 8) bearing against rear surface 7550 of head 712 to hold the male and female members mated against any tension forces tending to cause separation. In this position, a portion of elongated protrusion 707 fits within narrow portion 780 of slot 778 of male member 712, thereby providing the desired rotational alignment during the final stages of mating.

Figure 9:
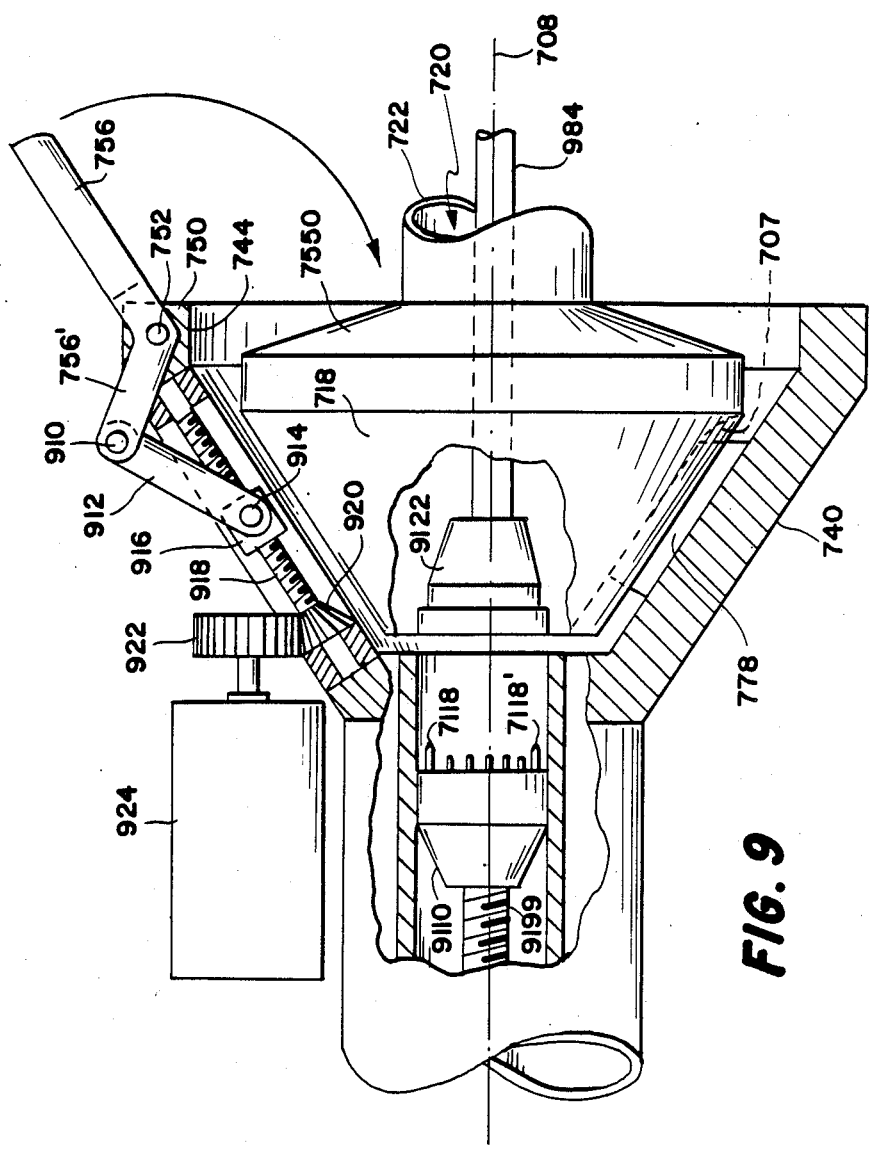
FIG. 9 is a cross-sectional view thereof looking in the direction of section arrows 9—9.

FIG. 9 is a cross-section of the structure of FIG. 8, illustrating details of the lip-actuating motor and of connector mating arrangement. In FIG. 9, lip 756 is seen to include an integral lever 756' loosely pinned by a pin 910 to one end of a link 912. The other end of link 912 is loosely pinned by a pin 914 to a nut 916 threaded onto a threaded shaft 918. Shaft 918 is supported for rotation at its ends, and is affixed to a conical gear 920 which engages a spur gear 922. Gear 922 is driven by a reversible electrical motor 924. When motor 924 rotates, shaft 918 also rotates, driving nut 916 along the shaft in a direction selected by the direction of rotation of motor 924. Motion of nut 916 in turn actuates link 912 to selectively open or close lip member 756.

FIG. 9 also illustrates an electrical cable 984 which passes through bore 722 and which is associated with a connector support element 9122. Support element 9122 can be seen in frontal view in FIG. 10. Support element 9122 supports electrical connector halves 7114' and 7116', corresponding to connector halves 114' and 116' illustrated in FIG. 2. FIG. 10 also illustrates alignment sockets 7120, 7120' corresponding to sockets 120, 120' of FIG. 2, and which perform the same function vis-a-vis the mating connector support 9110 (FIG. 9) and its associated alignment pins 7118, 7118'.

In the arrangement illustrated in FIGS. 7-10, mating of the electrical connection may be accomplished during final mating of the male and female members as described in conjunction with the arrangement of FIGS. 1-6, or alternatively, as illustrated in FIG. 9 the connector support plate 9110 may ride on axial tracks (not illustrated), driven by the captivated end of a threaded shaft 9199 which advances or retracts axially in response to rotation to thereby advance or retract connector support 9110. When connector support 9110 is advanced toward connector support 9122 in FIG. 9, alignment pins 7188 provide any necessary lateral adjustment, whereupon final mating of the halves of the electrical connectors 7114, 7116 occurs.

Other embodiments of the invention will be apparent to those skilled in the art. For example, a clambering robot including two or more female members 14 each on the end of each articulated arm 414 can clamber over a surface including a plurality of spaced-apart male members 12, deriving its power, and its control signals, if appropriate, from a source coupled to the male members associated with the surface upon which the clambering occurs. Such a robot moves by alternately connecting and disconnecting from adjacent male members 12, always maintaining at least one mated male-to-female connection in order to receive power and signals. The various parts may be made principally from magnesium or aluminum for weight saving, or from other materials when appropriate. Actuating plate 70 may be made of a carbon composite for weight saving. More or less fingers or lip members than three may be used, and any method for opening and closing is acceptable. A manual crank may be used in place of, or in addition to a motor should a motor failure occur. While slots 54 in fingers 56 have been illustrated as through slots, they need not extend all the way therethrough.

What is claimed is:

1. A coupling arrangement for aligning and mating connectors, and for transfer of structural loads, comprising:

a male member including a head, said head having the approximate shape of the frustum of a cone with a concave side, a base and a central bore, said cone, said base and said central bore being centered on a first axis lying in a first plane, said base being affixed to a support structure to which said loads are transferred, said head further comprising at least one index pin having a diameter, said index pin lying in said first plane and projecting from said concave side in a radial direction relative to said first axis;

a polarized first connector portion of a mating polarized connector pair, said first connector portion being located in said bore for substantially axial engagement and having a predetermined orientation relative to said first plane;

a female member defining a cavity with an opening defining an outer periphery, said cavity being centered on a second axis lying in a second plane and having walls in a shape similar to that of the inside of a bell, said walls defining a fundus remote from said opening of said cavity, said female member further including a slot in said walls, said slot being centered on said second plane, the width of said slot being substantially equal to said diameter of said pin at locations nearest said fundus, and tapering to a width greater than said diameter at locations remote from said fundus, said second axis and said second plane being drawn into a congruent relationship with said first axis and said first plane, respectively, when said male and female members are fully mated;

a polarized second connector portion of said mating polarized connector pair, said second connector portion being mounted for axial engagement at said fundus and having said predetermined orientation relative to said second plane, whereby when said male and female members are mated and said first and second planes are congruent, said connectors are correctly poled for mating;

movable lip means mechanically coupled to said periphery of said cavity and adapted for movement between an open position exposing said cavity and a closed position, and being adapted for grasping said head of said male member during engagement and for drawing said head into, and thereafter holding, said head in full mating relationship with said cavity, whereby rotary forces are transferred by means including said slot and index pin between said female member and said support structure, and compressive axial forces are transferred by said mating head and cavity, and tensile axial forces are transferred by said lip means between said female member and said base of said head.

2. A coupling arrangement according to claim 2 wherein said polarized connector pair is adapted for coupling of electricity.

3. A coupling arrangement according to claim 1 wherein said support structure to which said base of said male member is affixed comprises a shaft smaller in diameter than the diameter of said base.

4. A coupling arrangement according to claim 1 wherein:

said male member includes an annular depression in said concave side near said central bore, thereby defining a spherical surface component of said side of said head; and said cavity of said female member includes a cylindrical portion adjacent said fundus, said diameter of said cylindrical portion being dimensioned to mate with said spherical surface along a first line contact.

5. A coupling arrangement according to claim 4 wherein:
said concave side of said male member includes a cylinder-like surface position adjacent said base; and
said cavity of said female member includes a cylindrical portion adjacent said outer periphery, dimensioned to mate with said cylinder-like surface portion of said male member along a second line contact.

6. A coupling arrangement according to claim 5 wherein said walls of said cavity having a shape similar to the inside of a bell are dimensioned relative to said concave side of said head so that when said male and female members are fully mated, support is provided principally along said first and second line contacts.

7. A coupling arrangement according to claim 1 wherein said movable lip means comprises actuable elongated fingers captivated at a proximate end of said fingers near said periphery of said cavity, each of said fingers being actuable between said open position in which the distal end of said finger is relatively remote from said second axis, and said closed position in which said distal end is relatively nearer said second axis, whereby in said first position of said fingers, said cavity is exposed.

8. A coupling arrangement according to claim 7 wherein each of said fingers comprises a track, said track engaging a stationary rider located near said periphery of said cavity, at least a portion of each of said fingers being capable of motion in a generally axial direction as said track runs along said stationary rider, said track being arranged for causing said distal ends of said fingers to move between said open and closed positions in response to said axial movement.

9. A coupling arrangement for aligning and mating connectors, and for transfer of structural loads, comprising:
a male member including a head, said head having the approximate shape of the frustum of a cone, including a base, tapered side, and a central bore, said base and said central bore being centered on a first axis lying in a first plane, said base being affixed to a support structure to which said loads are transferred, said head further comprising at least one of (a) an elongated index protrusion having a lateral width, said index protrusion having the direction of elongation lying in said first plane and projecting from said tapered side of said head in a radial direction relative to said first axis, and (b) an elongated slot in said tapered side of said head, said slot having the direction of elongation lying in said first plane, said slot having a first width at location near said base, and tapering to a second width greater than said first width at locations remote from said base;
a polarized first connector portion of a mating polarized connector pair, said first connector portion being located in said bore for substantially axial engagement and having a predetermined orientation relative to said first plane;
a female member defining a cavity with an opening defining an outer periphery, said cavity being centered on a second axis lying in a second plane and having walls in the general shape of a truncated cone, said walls defining a fundus remote from said opening of said cavity, said female member further including at least one of (a) an elongated slot in said walls of said cavity when said male member includes an index protrusion projecting from said tapered side, the direction of elongation of said slot lying in said second plane, the width of said slot being substantially equal to said lateral width of said index protrusion at locations nearest said fundus, and tapering to a width greater than said lateral width at locations remote from said fundus, and (b) an elongated index protrusion extending from said walls of said cavity when said male member includes said elongated slot in said tapered side, said elongated index protrusion having a lateral width substantially equal to said first width of said elongated slot in said tapered side of said male member, the direction of elongation and the direction of protrusion of said index protrusion lying in said second plane, whereby said second axis and said second plane are drawn into congruence with said first axis and said first plane, respectively, when said male and female members are fully mated;
a polarized second connector portion of said mating polarized connector pair, said second connector portion being mounted for axial engagement at said fundus and having said predetermined orientation relative to said second plane, whereby when said male and female members are mated and said first and second planes are congruent, said connectors are correctly poled for mating;
movable lip means mechanically coupled to said periphery and adapted for movement between an open position exposing said cavity and a closed position, and being adapted for grasping said head of said male member during engagement and for drawing said head into full mating relationship with said cavity and thereafter pressing against said base of said head for holding said head in full mating relation with said cavity, whereby rotary forces are transferred by means including said index protrusions and mating slots between said female member and said support structure, and axial tension forces are transferred by said lip means bearing against said base.

* * * * *